(12) United States Patent  (10) Patent No.: US 8,468,051 B2
Swenson  (45) Date of Patent: Jun. 18, 2013

(54) SELECTING AND DELIVERING PERSONALIZED CONTENT

(75) Inventor: Marcus K. Swenson, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 372 days.

(21) Appl. No.: 12/831,938

(22) Filed: Jul. 7, 2010

(65) Prior Publication Data

US 2011/0302028 A1  Dec. 8, 2011

Related U.S. Application Data

(60) Provisional application No. 61/351,619, filed on Jun. 4, 2010.

(51) Int. Cl.
*G06Q 30/00* (2012.01)

(52) U.S. Cl.
USPC .......................................... 705/14.1

(58) Field of Classification Search
USPC .......................................... 705/14.1
See application file for complete search history.

(56) References Cited

U.S. PATENT DOCUMENTS

| | | |
|---|---|---|
| 6,647,425 B1 | 11/2003 | Chaddha |
| 2004/0015408 A1 | 1/2004 | Rauen, IV et al. |
| 2007/0027762 A1 | 2/2007 | Collins et al. |
| 2007/0067297 A1* | 3/2007 | Kublickis ........................... 707/9 |
| 2009/0175429 A1 | 7/2009 | Cohen et al. |
| 2009/0222117 A1 | 9/2009 | Kaplan et al. |
| 2009/0271267 A1 | 10/2009 | Moukas et al. |

FOREIGN PATENT DOCUMENTS

WO  WO0193161 A1  12/2001

OTHER PUBLICATIONS

"Turbo-Charging Dynamic Web Sites with Akamai EdgeSuite", Pub. Date 2001, www.akamai.com, (16 pages).
"Planning an Interaction Strategy", Pub. Date 2008, http://download.oracle.com/docs/cd/E13155_01/wlp/docs103/interaction/interaction.html, (7 pages).
"Performance and Caching", Pub. Date 2004, http://download.oracle.com/docs/cd/B10464_05/core.904/b10375/caching.htm, (10 pages).
Adam Field, Pieter Hartel, Wim Mooij, "Personal DJ, an Architecture for Personalised Content Delivery", Pub. Date May 1-5, 2001, http://www10.org/cdrom/papers/384/index.html, (15 pages).
"WebLogic® Portal", Pub. Date 2001, www.bea.com, (5 pages).
Mor Naaman, Hector Garcia-Molina, Andreas Paepcke, "Evaluation of Delivery Techniques for Dynamic Web Content", http://www2003.org/cdrom/papers/poster/p268/Poster.htm, (3 pages).
"Cisco Content Delivery Engine Generation 2", Pub. Date 2009, (13 pages).

* cited by examiner

*Primary Examiner* — Daniel Lastra
(74) *Attorney, Agent, or Firm* — Workman Nydegger

(57) ABSTRACT

The definition of campaign tactics as associating customized content to associated audiences in a relational database. These associations may be cached in a content association mapping that may be read from without accessing the database. The content association mappings may cached in one or more front end servers, and may be updated periodically by navigating the relational database. For a given tactic, the system determines whether a user is a member of the associated audience, identifies the content to be delivered by referring to the content association mapping, and then delivers the content to the user.

20 Claims, 11 Drawing Sheets

| Row | Campaign Id | Campaign Priority | Tactic Id | Tactic Priority | Profile Group Id | Content External Key | IsInclusive |
|---|---|---|---|---|---|---|---|
| 1 | C1 | 1 | T1 | 1 | PG1 | Home/Engagement/StoreManager | 1 |
| 2 | C1 | 1 | T1 | 1 | PG2 | Home/Engagement/WebSeminar | 1 |
| 3 | C1 | 1 | T2 | 2 | PG1 | Home/Engagement/Website | 1 |
| 4 | C2 | 2 | T3 | 1 | PG2 | Home/Email/WebSite2 | 1 |
| 5 | C2 | 2 | T3 | 1 | PG2 | Home/Engagement/Website3 | 1 |
| 6 | C2 | 2 | T3 | 1 | PG3 | Home/Engagement/Website4 | 1 |
| 7 | C2 | 2 | T3 | 1 | PG4 | Home/Engagement/Website5 | 0 |

SELECTING AND DELIVERING PERSONALIZED CONTENT

CROSS-REFERENCE TO RELATED APPLICATIONS

This patent application claims the benefit under 35 U.S.C. 119 of U.S. provisional patent application Ser. No. 61/351,619 filed Jun. 4, 2010, and entitled "Selecting and Delivering Personalized Content".

BACKGROUND

Online personalization is a process of gathering information about website users, analyzing the information, and, based on the analysis, delivering the right content to each user at the right time. It is an important technology needed for advertising, customer relationship management, and marketing campaigns.

Efficiently selecting and delivering personalized content becomes difficult when faced with increasing amounts of users, user characteristics, content, and marketing campaigns. In such circumstances, it is difficult to take advantage of typical content caching techniques because few user content experiences will be personalized in the same manner.

BRIEF SUMMARY

Embodiments described herein relate to the defining of campaign tactics for delivering customized content to associated audiences. In some embodiments, tactics are defined by associating content with particular audiences in a relational database. These associations may be cached in a content association mapping that may be read from without accessing the database. For a given tactic, the system determines whether a user is a member of the associated audience, identifies the content to be delivered by referring to the content association mapping, and then delivers the content to the user.

As an example, a client having a user may submit a request for a web page that has one or more portions that may be customized. For a given tactic that applies to a portion of the web page to be customized, upon determining that the user is a member of the audience for that tactic, the associated content is delivered to the user for population into the customized portion of the web page.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 8 illustrates an example content association table that may be derived from the relational database table structure of FIG. 7;

DETAILED DESCRIPTION

In accordance with embodiments described herein, tactics are defined as associating customized content to associated audiences. In some embodiments, multiple tactics are defined by associating content with particular audiences in a relational database. These associations may be cached in a content association mapping that may be read from without accessing the database. For a given tactic, the system determines whether a user is a member of the associated audience, identifies the content to be delivered by referring to the content association mapping, and then delivers the content to the user.

First, some introductory discussion regarding computing systems will be described with respect to FIG. 1. Then, various embodiments of use of and the formulation of segments and profile groups will be described with reference to FIGS. 2 through 6. The process of defining and enforcing tactics based on profile groups will then be described with respect to FIGS. 7 and 8. In conclusion, a process for updating the segments in real-time will be described with respect to FIGS. 9 through 13.

Figure 1:
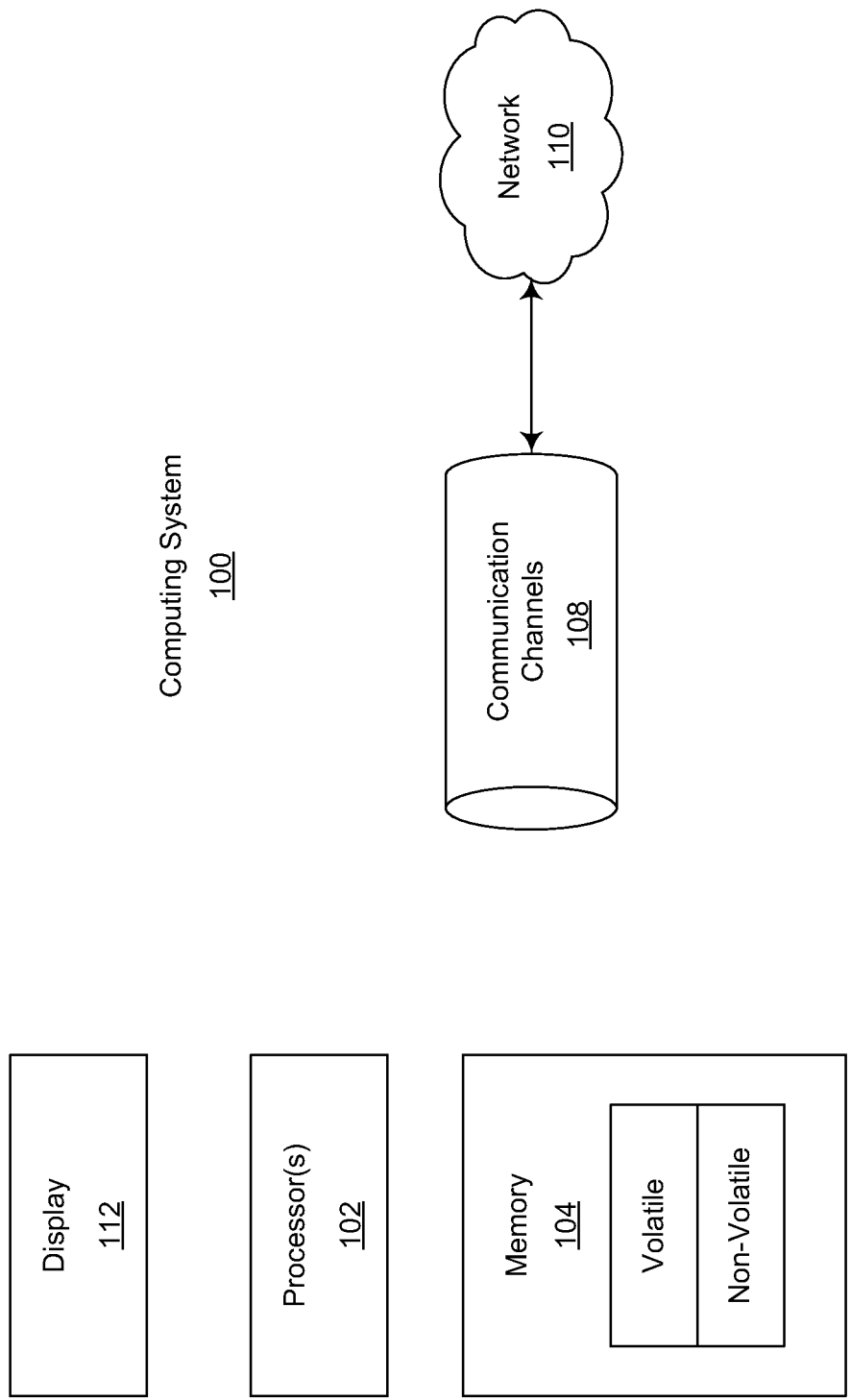
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

As previously mentioned, the principles described herein allow for efficient selection and delivery of content to particular users to provide the users with a customized user experience. Each user may be classified into our or more user groups (also called herein profile groups) with potentially different content provided to users of different profiles. FIGS. 2 through 6 describe an efficient mechanism for defining and populating such profiles. However, the broader principles described herein are not limited to the manner in which user groups are defined.

Figure 2:
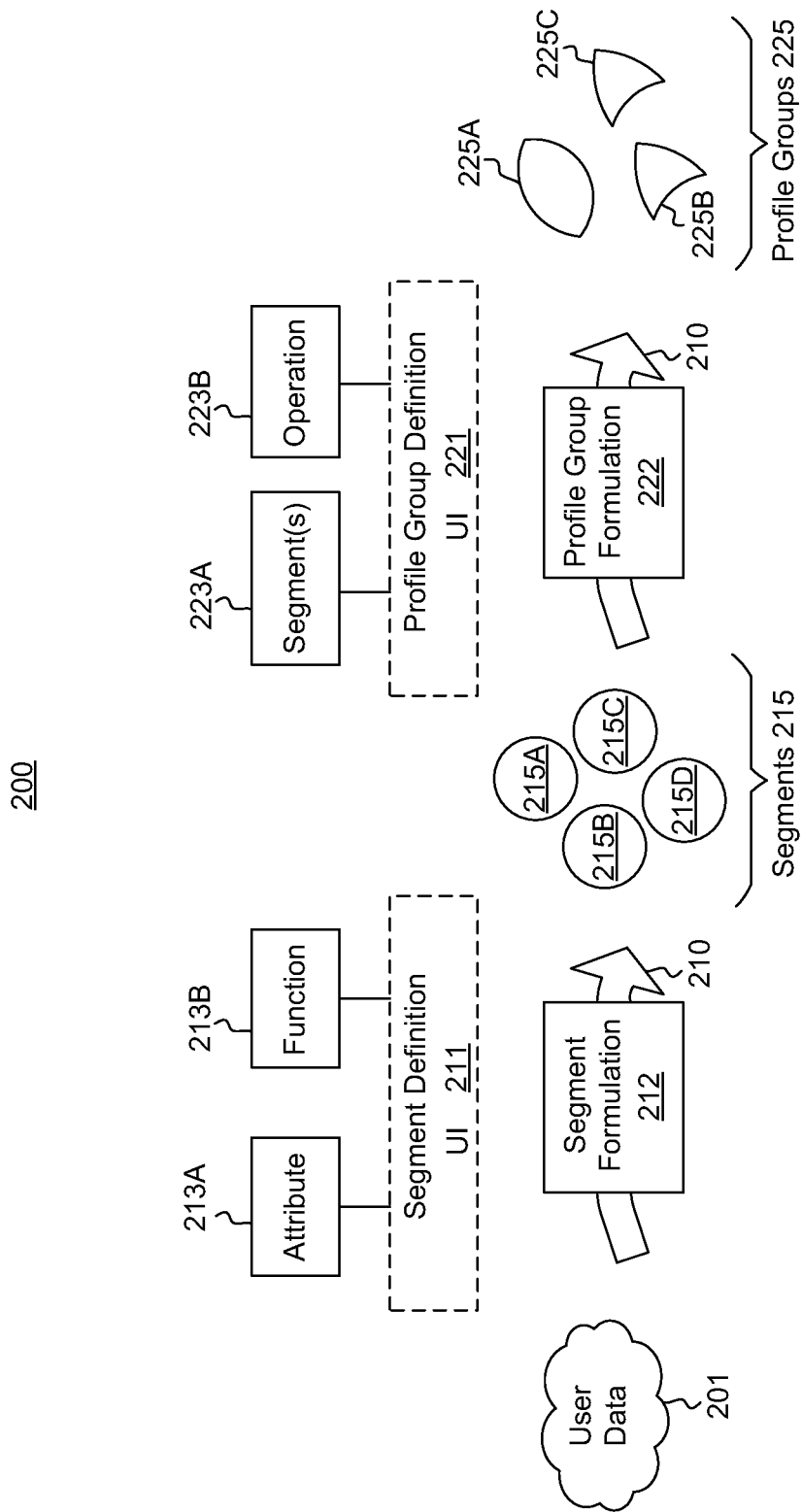
FIG. 2 illustrates an environment that illustrates a general process of the population of segments and the formulation of profile groups as directed through various user interfaces.

FIG. 2 illustrates an environment 200 in which profile groups may be defined. The environment 200 has access to user data 201. The user data 201 includes user attributes and are used to populate various user segments as will be described hereinafter. The user data may be obtained from a variety of data sources which may even be distributed.

A segment definition user interface 211 allows users to define one or more user segments. Each user segment is defined according to a single user attribute 213A and a function 213B. The segment definition user interface 211 may offer a number of user attributes to select from, and the user may select one to define each segment. In one embodiment, the user attributes are of a number of different data types. For each data type, the segment definition user interface 211 may also offer a predetermined set of functions to apply against the user attribute to populate the segment. In the example of FIGS. 3 through 6, there are four data types, each corresponding to a predetermined set of functions.

A segment formulation module 212 uses the segment definition to populate each of the defined segments by applying the corresponding function for the segment against the user attribute corresponding to the segment against the user data 201. This process is represented by segment formulation process 210 which represents the formulation of user segments for persisting by a computing system. The process of segment formulation may be applied periodically and/or upon the detection of one or more events.

The result of the segment population 210 is a number of populated segments 215, each segment being populated by or associated with zero or more user identifiers that satisfied the application of the segment function against the user attribute of the segment. In the illustrated case, there are only four such segments 215A, 215B, 215C, 215D, but there is no limit to the number of segments that may be formulated in this way. Furthermore, there is no requirement that all of the segments 215 be populated with the aid of the segment formulation module 212.

A profile group definition user interface 221 allows users to define profile groups by designating an operation 223B that is to be performed on selected segments 223A in order to populate each profile group. The selected segments 223A are taken from the pool of available segments 215. The profile group formulation module 222 automatically populates the defined profile group by performing the designated operation upon the selected segments. This population of profile groups may be performed for all or a subset of the profile groups on a periodic basis, or perhaps in response to an event. Each segment may be reused for multiple profile groups. An example of an operation that might be performed on selected segments in order to populate a profile group might be a designated one or more set operation that takes the set intersection of multiple segments, takes a set union of multiple segments, and/or applies segment exclusions in which members of a segment are specifically excluded from the profile group. The set operations may be performed directly on sets that are either a segment, or the results of a prior set operation.

Figure 3:
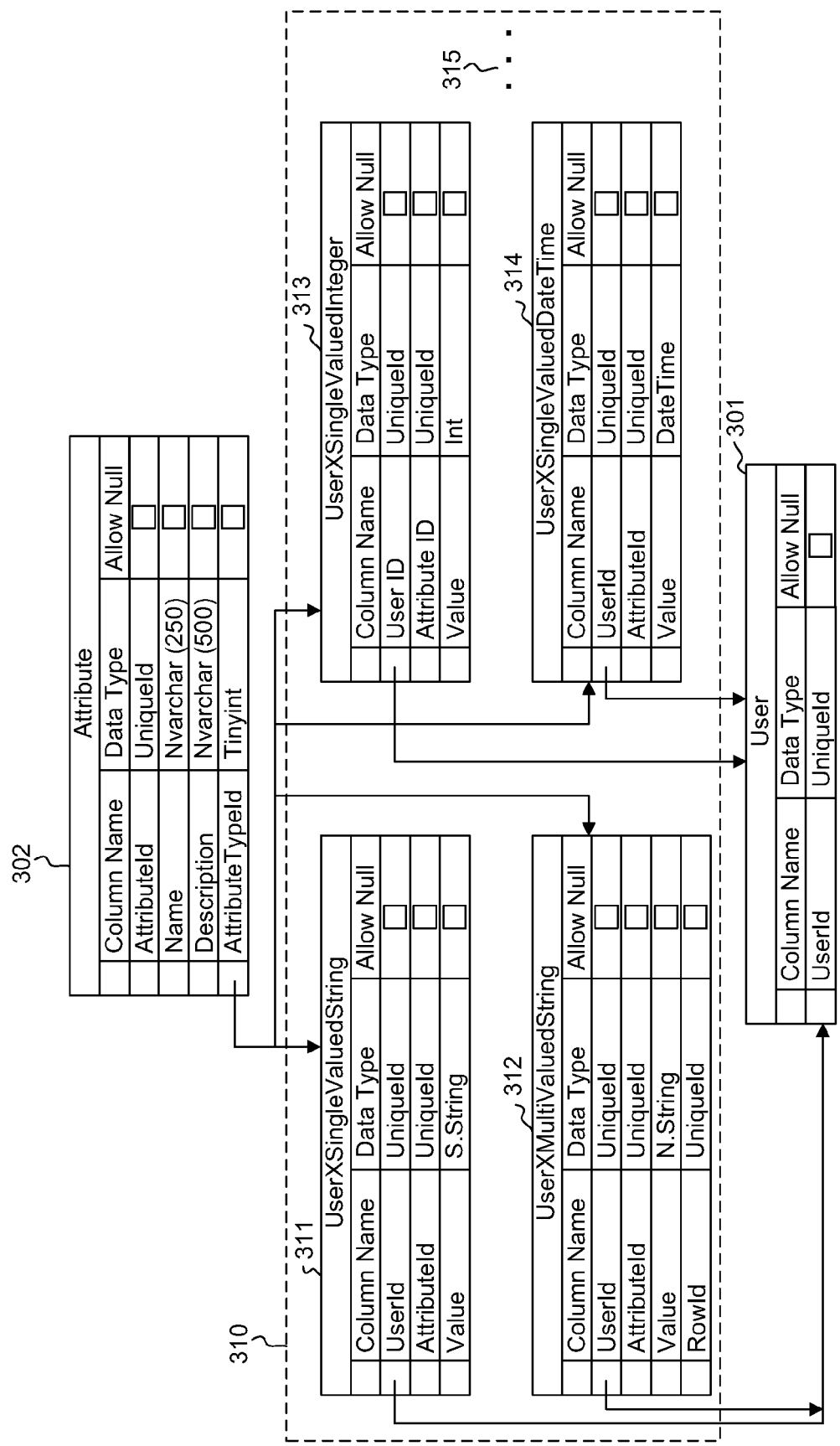
FIG. 3 illustrates relational database table structures involved with the defining of user attributes and their corresponding values.
Figure 4:
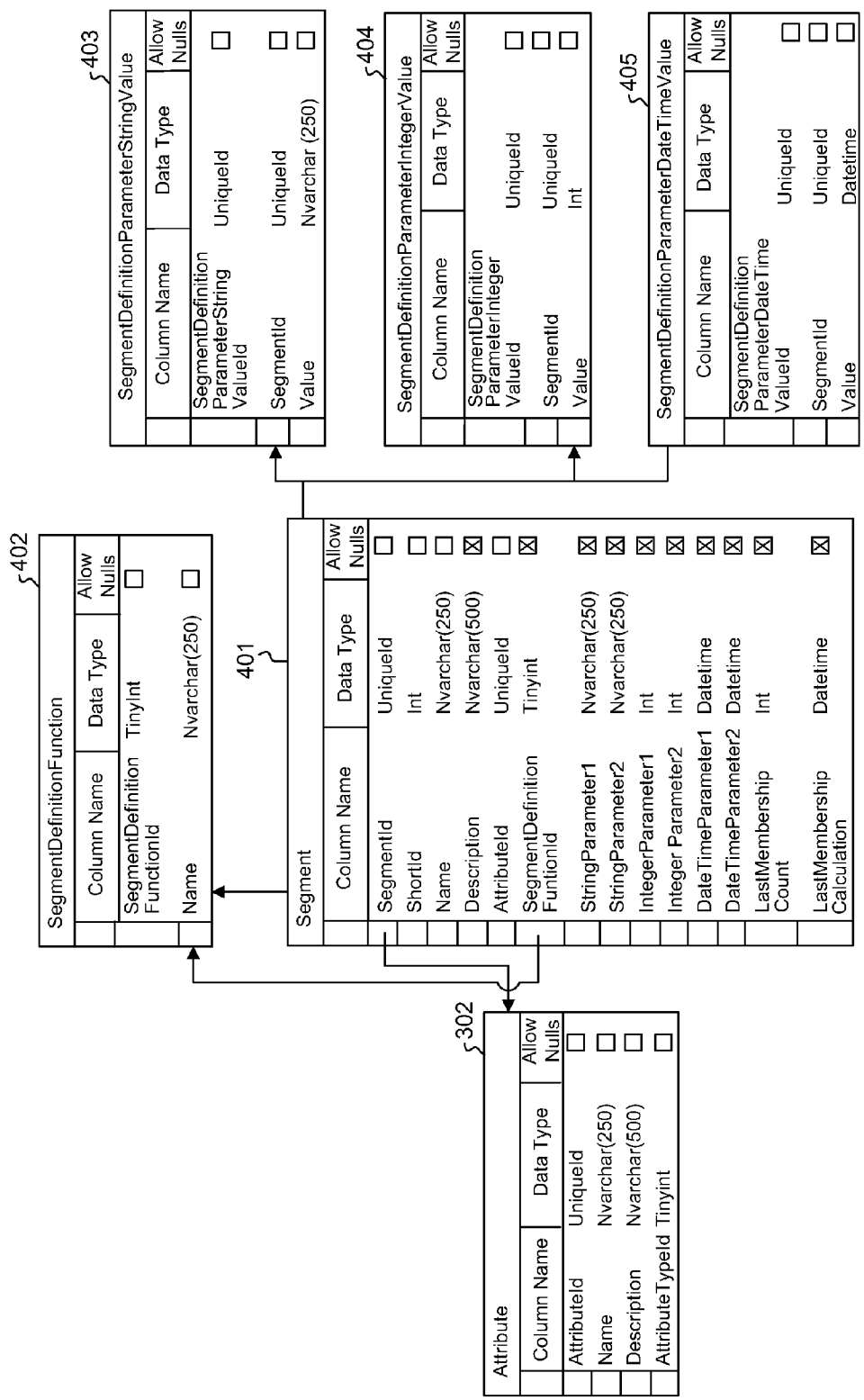
FIG. 4 illustrates relational database table structures involved with the defining of a segment based on a user attribute.
Figure 5:
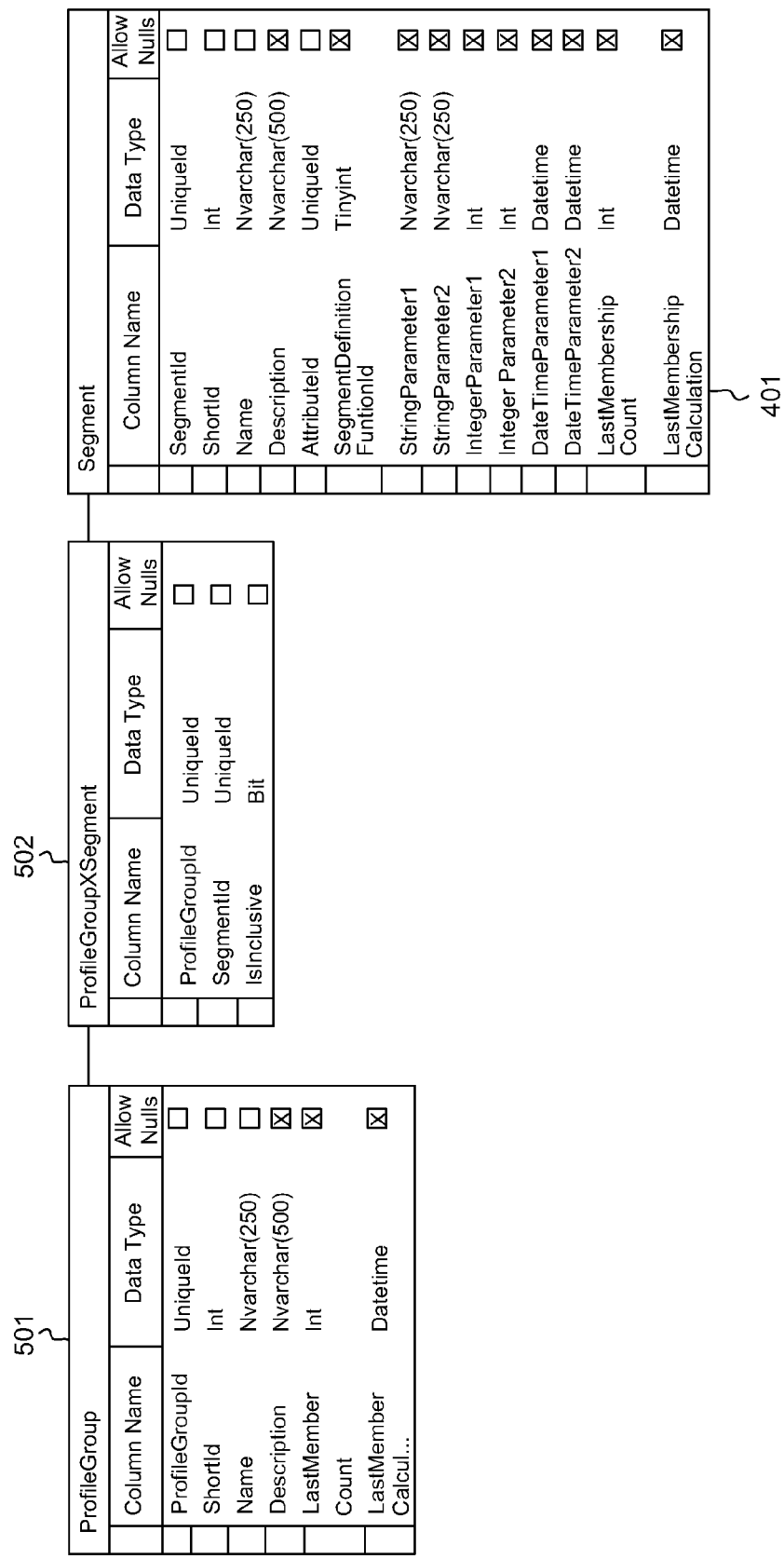
FIG. 5 illustrates relational database table structures involved with the defining of a profile group that is based on one or more segments.
Figure 6:
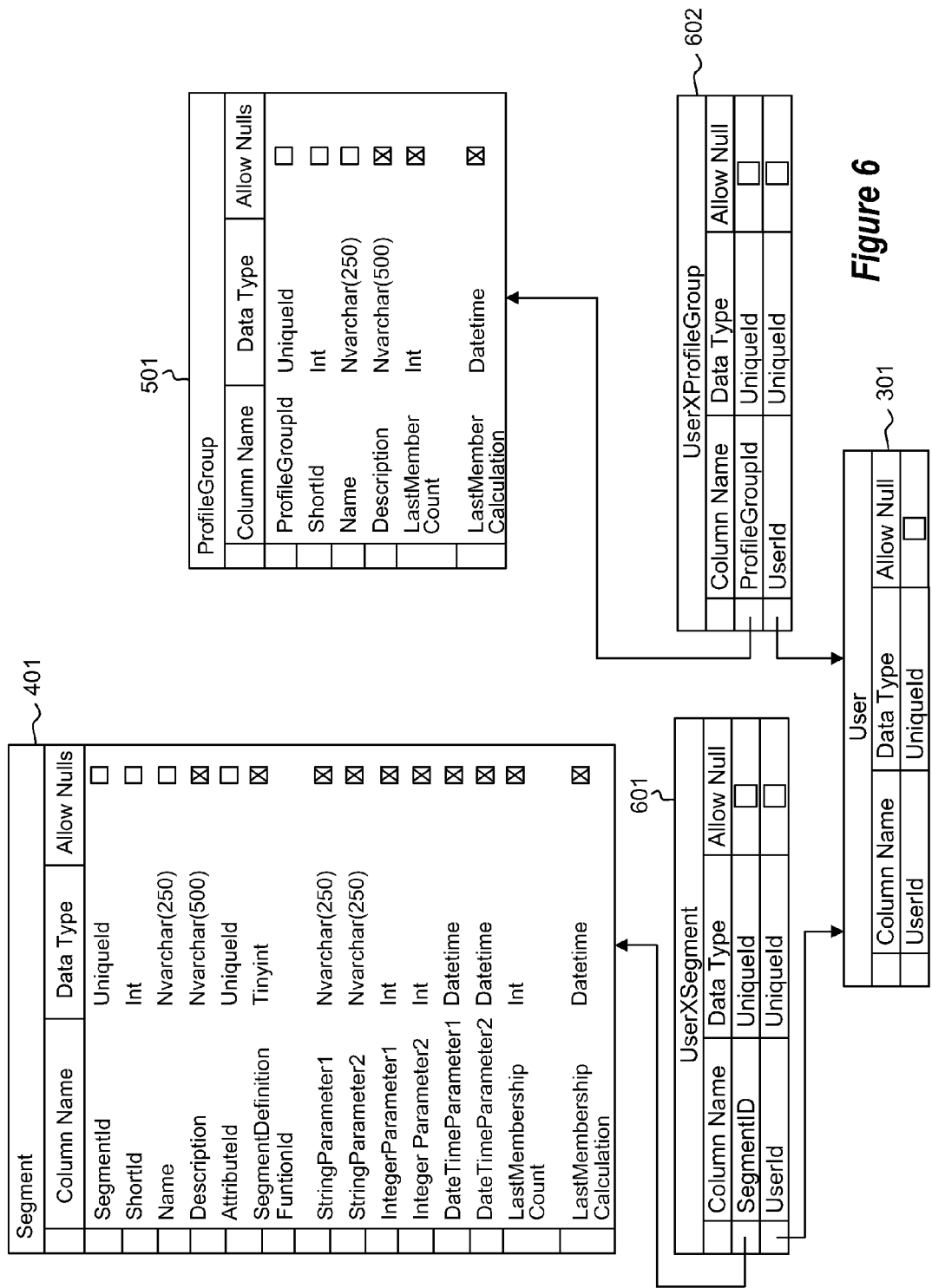
FIG. 6 illustrates relational database table structures involved with the storing of populated segments and profile groups.
Figure 7:
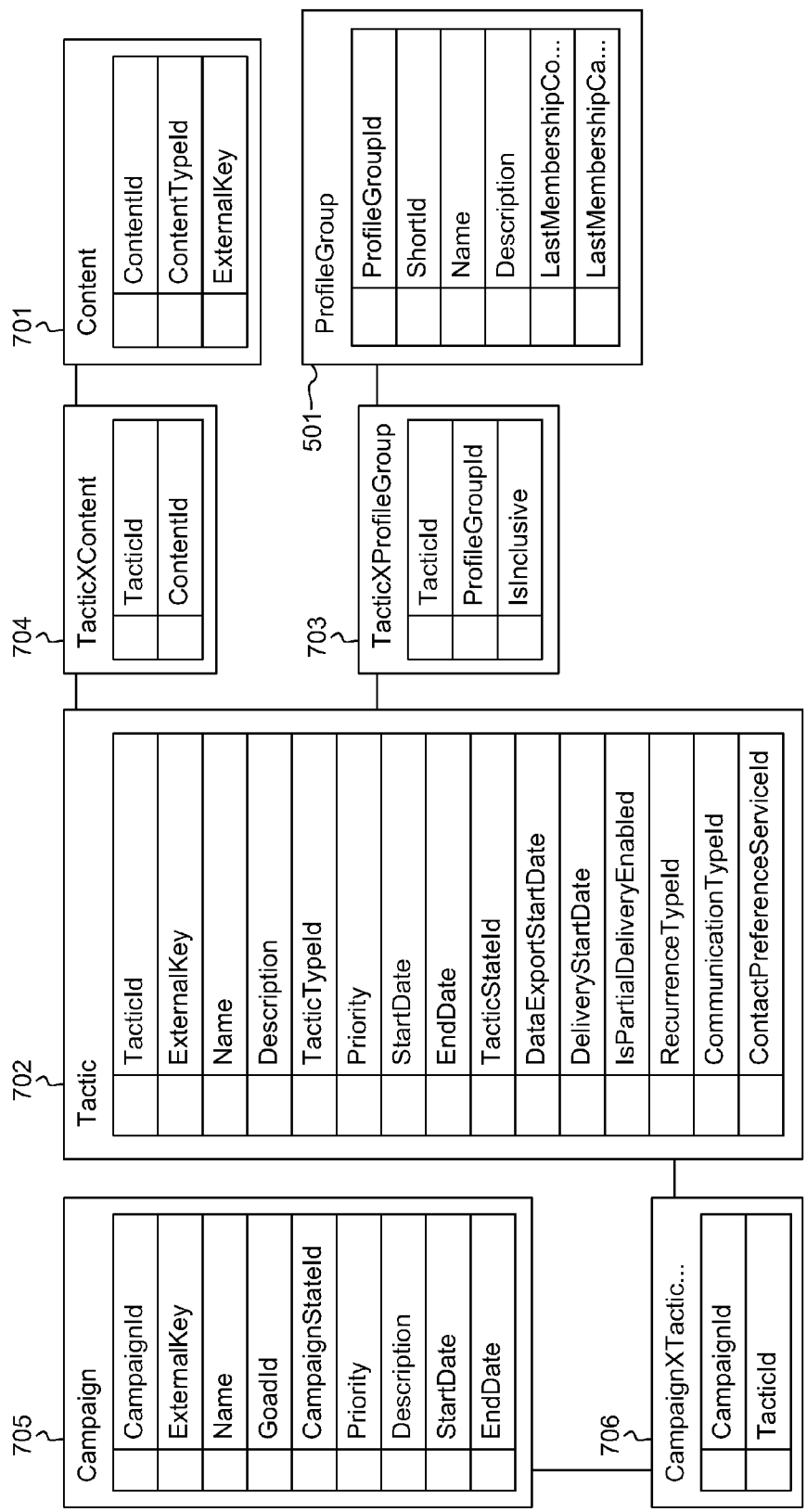
FIG. 7 illustrates a relational database table structure involved with the defining of campaigns and tactics for delivering content to audiences defined as set operations on profile groups.
Figure 9:
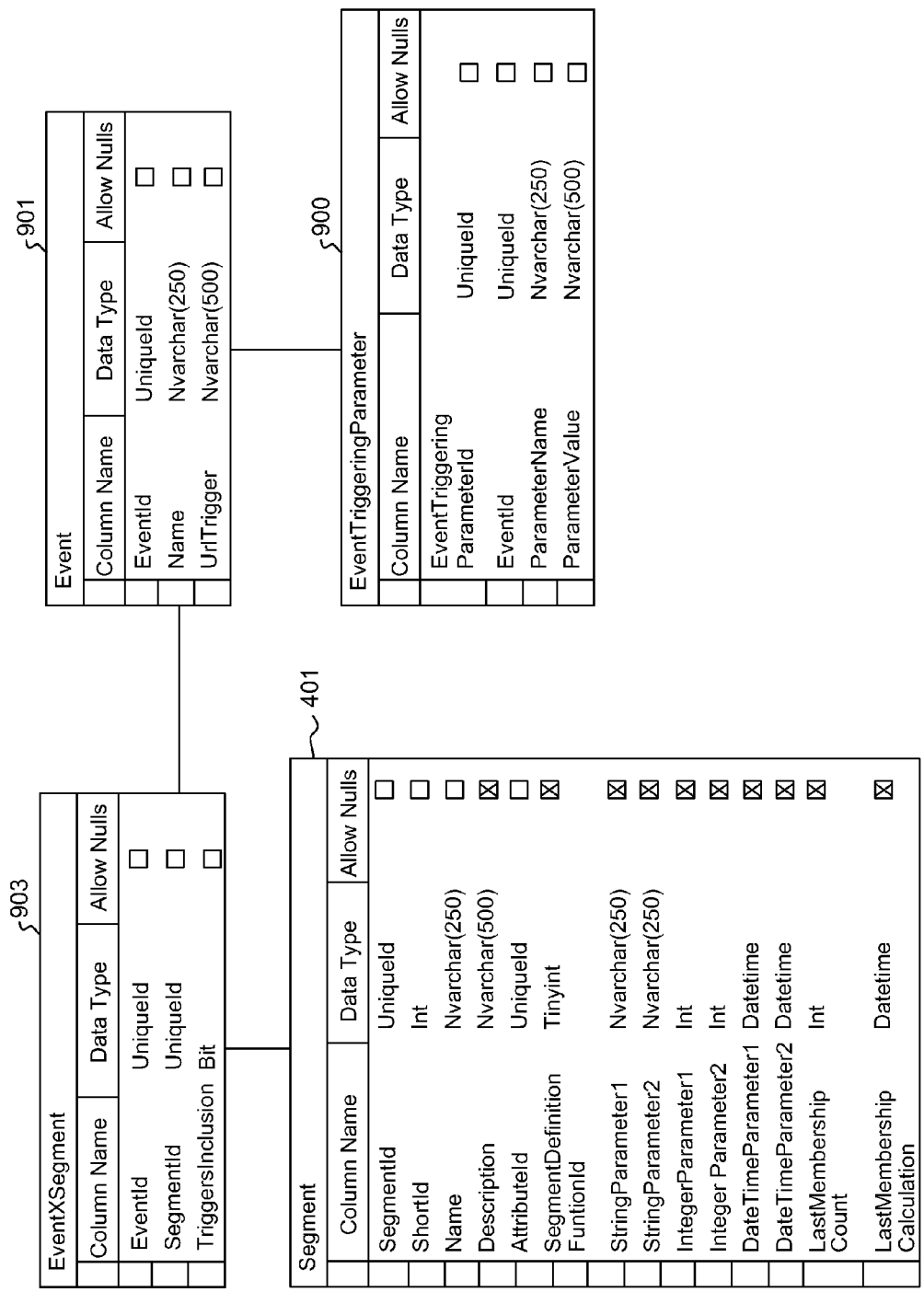
FIG. 9 illustrates relational database table structures involved with real-time adjustment of the population of the segments, and then real-time adjustment of profile groups, in response to run-time events.

FIGS. 3 through 7 and 9 each illustrate relational database table structures that permit for efficient determination of such profile groups, and association of content with profile groups. FIG. 3 illustrates relational database table structures involved with the defining of user attributes and their corresponding values. FIG. 4 illustrates relational database table structures involved with the defining of a segment based on a user attribute. FIG. 5 illustrates relational database table structures involved with the defining of a profile group that is based on one or more segments. FIG. 6 illustrates relational database table structures involved with the storing of populated segments and profile groups. FIG. 7 illustrates relational database table structures involved with real-time adjustment of the population of the segments in response to run-time events. FIG. 9 illustrate relational database tables used to update profile groups in response to events.

FIG. 3 illustrates relational database table structures involved with defining user attributes and their values. While the broader principles described herein are not limited to the manner in which user attributes and their values are maintained for multiple users, the configuration of FIG. 3 is highly efficient as it permits new user attributes to be added and old attributes to be removed without changing the underlying schema of FIG. 3. Furthermore, some of the tables of FIG. 3 have a relation to other tables illustrated in FIGS. 4 through 7 and 9. Accordingly, FIG. 3 will now be described in detail.

FIG. 3 includes a user table 301, an attribute table 302, and attribute type tables 310. In the illustrated case, the attribute type tables include a table for each possible data type, each storing values of the attributes of that type for all users. In the example implementation about to be described, there are four types of attributes; namely, single-valued string, multi-valued string, integer, and date/time. Accordingly, the attribute type tables 310 include a UserXSingleValuedString table 311, a UserXMultiValuedString table 312, a UserXInteger table 313, and a UserXDateTime table 314.

Each of the tables of FIGS. 3 through 8 may have one or more columns that are labeled in each of the tables along with the appropriate data type for each column. Each table may have multiple rows of data, each row including appropriate data for each of the corresponding column. In some cases, it is appropriate for a column to be populated with null for any given row, as represented by the "Allow Null" checkbox being checked. In the case of FIG. 3, none of the null checkboxes are checked for any of the columns. However, in the tables of FIGS. 4 through 7 and 9, some of the null checkboxes are checked indicating that this column will not always be populated for every row. Some of the tables may include column names not illustrated in FIGS. 3 through 7 and 9 for the sake of simplicity as such column names do not relate to the broader principles described herein. For instances, tables might include a creation date, last modified date, created by, last modified by columns, which are used for administration only. Accordingly, only the relevant column names are illustrated.

The user table 301 includes just one column, a UserId, which simply designates a unique identifier for each user being tracked. As will be explained, each user may be populated into one or more segments and one or more profile groups based on their attributes.

The attribute table 302 defines each user attribute of interest, with each attribute corresponding to a row in the table. For each attribute, the attribute table 302 includes an AttributeId uniquely identifying the attribute. Each attribute also has a name (defined by a string), and a description (also defined by a string) which allows the attribute to be identified and understood by human beings having access to the name and description.

Each attribute includes an AttributeTypeId (also perhaps called an AttributeDataTypeId) which identifies (using an integer) the type of attribute. For instance, in the illustrated case, there are four attribute types previously mentioned; namely, single-valued string, multi-valued string, integer, and date/time. Using the AttributeTypeId, the system can infer which of the tables 310 to find the values for that attribute for all users, and which segment functions are application for the attribute selected in a segment.

For example, each row of the UserXSingleValuedString table 311 defines a particular value for a single-valued string attribute for a particular user. A single-valued string attribute would be an attribute of the user for which the user might expect to have only one string value. For instance, a user can live in only one country at a time. Accordingly, a residence country attribute may be expected to be a single-valued string. Other examples of user attributes that may be expected to be a single-valued string include, for example, preferred language, birth country, political affiliation, marital status. Each row of the UserXSingleValuedString table 311 includes a column designating the UserId that the row relates to, a column designating the AttributeId that the row relates to, and value that specifies the actual value of the single-valued string for that user and that attribute. The rows in their entirety may thus define all values for all single-valued string attributes for all users.

Each row of the UserXMultiValuedString table 312 defines a particular value for a multi-valued string attribute for a particular user. A multi-valued string attribute would be an attribute of the user for which the user might expect to potentially having any number (zero, one, or perhaps many) string values. For instance, the multi-valued string could list the products purchased by the user perhaps within a given time period, or perhaps list the countries that the user is estimated to have visited. Each row of the UserXMultiValuedString table 312 includes a column designating the UserId that the row relates to, a column designating the AttributeId that the row relates to, and value that specifies the actual value of the multi-valued string for that user and that attribute. The UserXMultiValuedString table 312 also includes a column specifying a RowId. The composite primary key of the UserId, AttributeId, and RowId enables users to have multiple values for the same attribute. The table 312 in its entirety may thus define all values for all multi-valued string attributes for all users.

Each row of the UserXSingleValuedInteger table 313 defines a particular value for an integer attribute for a particular user. An integer attribute would be an attribute of the user for which the user might expect to potentially be an integer value such as an age, a year of birth, a number of children, a number of log-in attempts in a given time period, a number of purchases made in a given time period, and so forth. Each row of the UserXSingleValuedInteger table 313 includes a column designating the UserId that the row relates to, a column designating the AttributeId that the row relates to, and an integer value that corresponding to that particular user and integer attribute.

Each row of the UserXSingleValuedDateTime table 314 defines a particular value for a date/time attribute for a particular user. Such attributes may be, for example, a date of last log-in, a date of last purchase, a date of purchase of a particular item, a date of birth, a median time of day that the user logs-in, and so forth. Each row of the UserXSingleValuedDateTime table 314 includes a column designating the UserId that the row relates to, a column designating the AttributeId that the row relates to, and a date/time value that corresponding to that particular user and integer attribute.

The horizontal ellipses 315 represents that when other attribute types are added, this can be done without changing the overall schema. For instance, suppose that a new attribute was to be formulated called "HaveCat", and the attribute type is a Boolean, which is a data type not represented by tables 311 through 314. In that case, a new table UserXBoolean may be added as associated with an AttributeTypeId. Also, a new attribute would be defined as a new row in the Attribute table 302 specifying the new AttributeTypeId that maps to the UserXBoolean table. Thus, new attributes may be easily added to the system, even if those new attributes are of a new attribute type.

Thus, the aggregation of tables 301, 302, and 310 allow a flexible arrangement to define values of a variety of attributes for a variety of users.

FIG. 4 illustrates relational database table structures involved with the defining of a segment based on a user attribute. As explained, regardless of how the user attributes are defined, a segment is defined based on a segment definition function being applied to one attribute. Various parameters may also be involved with the segment definition function. The types of segment definition functions may differ depending on the attribute type. The types of parameters will depend on the segment definition function. The following table defines an example implementation of segment definition functions and parameters for each of the example data types in the example of FIGS. 3 through 7:

| Attribute Data Type/ Cardinality | Available Function | Parameters | Default Coalesce |
|---|---|---|---|
| String/ Single Value | SingleValuedStringIsEqualTo | Single string | Empty String |
| | SingleValuedStringIsNotEqualTo | Single string | Empty String |
| | SingleValuedStringIsInList | List of strings | Empty String |
| | SingleValuedStringIsNotInList | List of strings | Empty String |
| String/ Multi Valued | MultiValuedStringHasAnyValueEqualTo | Single string | Empty String |
| | MultiValuedStringHasAnyValueNotEqualTo | Single string | Empty String |
| | MultiValuedStringHasAnyValueInList | List of strings | Empty String |
| | MultiValuedStringDoesNotHaveAnyValueInList | List of strings | Empty String |
| | MultiValuedStringHasAnyValueNotInList | List of strings | Empty String |
| DateTime/ Single Value | SingleValuedDateTimeIsEqualTo | Single datetime | DateTime.Min |
| | SingleValuedDateTimeIsNotEqualTo | Single datetime | DateTime.Min |
| | SingleValuedDateTimeIsGreaterThan | Single datetime | DateTime.Min |
| | SingleValuedDateTimeIsLessThan | Single datetime | DateTime.Max |
| | SingleValuedDateTimeIsInRange | Two datetimes | DateTime.Min |

-continued

| Attribute Data Type/ Cardinality | Available Function | Parameters | Default Coalesce |
|---|---|---|---|
| | SingleValuedDateTimeIsEqualToTodayPlusOrMinus | (min, max) Single Integer | DateTime.Min |
| | SingleValuedDateTimeIsInList | List of datetimes | DateTime.Min |
| | SingleValuedDateTimeIsNotInList | List of datetimes | DateTime.Min |
| Integer/ Single Value | SingleValuedIntegerIsEqualTo | Single integer | 0 |
| | SingleValuedIntegerIsNotEqualTo | Single integer | 0 |
| | SingleValuedIntegerIsGreaterThan | Single integer | 0 |
| | SingleValuedIntegerIsLessThan | Single integer | 0 |
| | SingleValuedIntegerIsInRange | Two integers (min, max) | 0 |
| | SingleValuedIntegerIsInList | List of integers | 0 |
| | SingleValuedIntegerIsNotInList | List of integers | 0 |

In this example, if the attribute type that the segment is based on is a single-valued string, there are 4 possible segment definition functions, with the possibility of convenient expansion beyond 4 as described further below. As an example, suppose the attribute is a residence country of the user (i.e., a "residence country attribute"). The segment might be defined by the country attribute using the SingleValuedStringIsEqualTo function with a corresponding string parameter. Thus, a segment based on the country attribute, with the corresponding segment definition function SingleValuedStringIsEqualTo, and with the corresponding string parameter "United States" will include all users whose residence country attribute is "United States".

Also, a segment based on the country attribute, with the corresponding segment definition function SingleValuedStringIsNotEqualTo, and with the corresponding string parameter "United States" will include all users who have a residence country attribute that is not the United States.

A segment based on the country attribute, with the corresponding segment definition function SingleValuedStringIsInList, and with the corresponding list of strings parameters "France, Germany, Luxembourg" will include all users who have a residence country attribute that is one of France, Germany or Luxembourg.

Finally, a segment based on the country attribute, with the corresponding segment definition function SingleValuedStringIsNotInList, and with the corresponding list of strings parameter "France, Germany, Luxembourg" will include all users who have a residence country attribute that is not one of France, Germany or Luxembourg.

In this example, there are four segment definition functions corresponding to segments that are defined by attributes that are single-valued strings. However, more functions may be added. For instance, there might be a new segment definition function ContainsSubstring that returns all users who have a particular string as a portion of the string of the corresponding attribute. There might also be a BeginsWith or EndsWith function that allows filtering by the beginning or ending portion of the string value. Each additional function would result in an additional entry in the SegmentDefinitionFunction table 402. Additionally, a stored procedure corresponding to the additional segment definition function would be added to be used to evaluate the segment membership with the function. The same principle may be used to add segment definition functions to segments defined based on attributes that are multi-valued strings, integers, datetimes, or any other attribute type. Accordingly, the principles described herein may be applied to add specific segment definition functions that are beyond those described herein.

Since not all users will have particular attributes that are used to populate a segment, the application of segment definition functions may cause users without such values to have a coalesce operation applied. Specifically, when a user does not have a value for a particular attribute, a default value is applied just for purposes of applying the segment definition function. In the case of a segment that is defined by a single-valued string, if the user does not have that particular attribute, the user is treated as having an empty string when populating the segment. Similarly, referring to the right column of the table above, when a segment is being formulated based on a particular multi-valued string, users lacking a particular multi-valued string attribute will be treated as having an empty string for that attribute for the purpose of populating the segment. When a segment is being formulated based on a particular datetime, users lacking a particular datetime attribute will be treated as having either an earliest datetime (DateTime.Min) or a latest datatime (DateTime.Max) for that attribute for the purpose of populating the segment. When a segment is being formulated based on a particular integer, users lacking a particular integer attribute will be treated as having a particular integer (e.g., 0 in the above table) for that attribute for the purpose of populating the segment.

One exception is with respect to the SingleValuedDateTimeIsEqualToTodayPlusOrMinus function, which has a parameter of a single integer, but still a coalesce value of DateTime.Min. This is because the comparison is still of two DateTime values, a current DateTime and a reference DateTime. The input integer value is used to derive a DateTime based off of the current DateTime. For example, an input value of 7 to this function would select all users who have a datetime attribute value equal to today plus 7 days (or one week from today).

As an example of the use of coalesce values, suppose there is a segment defined as all users who logged into the website site less than 5 times. When applying the function, there is a question of what to do with users that exist in the system but have never logged in. In other words, there may not be a record in the attribute value table indicating a value of 0 for never logging in. The coalesce operation applied when evaluating the segment definition function allows a "default value" to be applied to users with no values for the attribute. In the above example, the default coalesce value is 0. The coalesce operation is applied to users with no value records when applying the functions as indicated. This enables users to participate in a segment if the default value meets the conditions of the segment definition.

In this example, if the attribute type that the segment is based on is a multi-valued string, there are 5 possible segment definition functions. As an example, suppose the attribute is a citizenship country of a user (i.e., a "citizenship attribute"). In this example, suppose a user is a dual citizen of the United States and the United Kingdom.

The segment might be defined by the citizenship attribute using the MultiValuedStringHasAnyValueEqualTo function with a corresponding single string parameter (in this example, assume the single string "United States" is provided as a parameter). The segment would thus include any user who has "United States" anywhere in the list of countries that they are a citizen of, regardless of whether they are also citizens of other countries as well.

The segment might be defined based on the citizenship attribute using the MultiValuedStringHasAnyValueNotEqualTo function with a corresponding single string parameter (in this example, assume again that the single string "United States" is provided as a parameter). The segment would thus include any user who has specified a country other than the "United States" anywhere in the list of countries that they are a citizen of, regardless of whether they are also citizens of other countries as well. Thus, the user who has a "United States and United Kingdom" citizenship attribute will be in this segment because the United Kingdom is not the United States.

The segment might be defined based on the citizenship attribute using the MultiValuedStringHasAnyValueInList function with a corresponding multi-string parameter (in this example, assume again that "United Kingdom", "France", "Germany", "Spain"" is provided as the multi-string parameter). The segment would thus include any user who has any of the listed countries in their citizenship attribute. Thus, the user who has the "United States and United Kingdom" multi-valued string citizenship attribute will be included in the segment because the user has "United Kingdom" listed in the user's citizenship attribute.

The segment might be defined based on the citizenship attribute using the MultiValuedStringDoesNotHasAnyValueInList function with a corresponding multi-string parameter (in this example, assume again that "United Kingdom", "France", "Germany", "Spain"" is provided as the multi-string parameter). The segment would thus include any user who does not have any of the listed countries in their citizenship attribute. Thus, the user who has the "United States and United Kingdom" multi-valued string citizenship attribute will not be included in the segment because the user has "United Kingdom" listed in the user's citizenship attribute, which is in the list of four countries.

The segment might be defined based on the citizenship attribute using the MultiValuedStringHasAnyValueNotInList function with a corresponding multi-string parameter (in this example, assume again that "United Kingdom", "France", Germany", "Spain"" is provided as the multi-string parameter). The segment would thus include any user who does have a country listed in their citizenship attribute that is not in the list. Thus, the user who has the "United States and United Kingdom" multi-valued string citizenship attribute will be included in the segment because the user has "United States" listed in the user's citizenship attribute, which is not in the list of four countries.

In this example, if the attribute type that the segment is based on is a date/time, there are 8 possible segment definition functions. As an example, suppose the attribute is last log-in date of a user (i.e., a "last log-in attribute"). In this example, suppose the last log-in attribute value is Jun. 29, 2009.

The segment might be defined by the last log-in attribute using the SingleValuedDateTimeIsEqualTo function with a corresponding single datetime parameter (in this example, assume the datetime value Jun. 30, 2009 is provided as a parameter). The segment would thus include any user who has last logged-in on Jun. 30, 2009. Thus, the user who has a Jun. 29, 2009 last log-in attribute will not be in the segment.

The segment might be defined by the last log-in attribute using the SingleValuedDateTimeIsNotEqualTo function with a corresponding single datetime parameter (in this example, assume the datetime value Jun. 30, 2009 is provided as a parameter). The segment would thus include any user who has last logged-in on a date other than Jun. 30, 2009. Thus, the user who has a Jun. 29, 2009 last log-in attribute will be in the segment.

The segment might be defined by the last log-in attribute using the SingleValuedDateTimeIsGreaterThan function with a corresponding single datetime parameter (in this example, assume the datetime value Jun. 30, 2009 is provided as a parameter). The segment would thus include any user who has last logged-in on a date later than Jun. 30, 2009. Thus, the user who has a Jun. 29, 2009 log-in attribute will not be in the segment.

The segment might be defined by the last log-in attribute using the SingleValuedDateTimeIsLessThan function with a corresponding single datetime parameter (in this example, assume the datetime value Jun. 30, 2009 is provided as a parameter). The segment would thus include any user who has last logged-in on a date earlier than Jun. 30, 2009. Thus, the user who has a Jun. 29, 2009 last log-in attribute will be in the segment.

The segment might be defined by the last log-in attribute using the SingleValuedDateTimeIsinRange function with two corresponding datetime parameters (in this example, assume the datetime values Apr. 1, 2009 and Jun. 30, 2009 are provided as parameters). The segment would thus include any user who has last logged-in between Apr. 1, 2009 and Jun. 30, 2009. Thus, the user who has a Jun. 29, 2009 last log-in attribute will be in the segment.

The segment might be defined by the last log-in attribute using the SingleValuedDateTimeIsEqualtoTodayPlusorMinus function with one corresponding integer parameter (in this example, assume the integer −5 (read "negative five") is provided as a parameter). The segment would thus include any user who has last logged-in on a date that is five days prior to today. Thus, if today is Jun. 30, 2009, the user who has a Jun. 29, 2009 log-in attribute will not be in the segment.

The segment might be defined by the last log-in attribute using the SingleValuedDateTimeIsInList function with a list of corresponding datetime parameters (in this example, assume the datetime values Jun. 28, 2009, Jun. 30, 2009, Jul. 2, 2009 and Jul. 4, 2009 are provided as parameters). The segment would thus include any user who has last logged-in on any of those four days. Thus, the user who has a Jun. 29, 2009 last log-in attribute will not be in the segment because Jun. 29, 2009 is not one of the listed days.

The segment might be defined by the last log-in attribute using the SingleValuedDateTimeIsNotInList function with a list of corresponding datetime parameters (in this example, assume the datetime values Jun. 28, 2009, Jun. 30, 2009, Jul. 2, 2009 and Jul. 4, 2009 are provided as parameters). The segment would thus include any user who has last logged-in on any day other than the four listed days. Thus, the user who has a Jun. 29, 2009 log-in attribute will be in the segment because Jun. 29, 2009 is not one of the listed days.

In this example, if the attribute type that the segment is based on is an integer, there are 7 possible segment definition functions. As an example, suppose the attribute is an age of a user (i.e., an "age attribute"). In this example, suppose the user has an age attribute of 17.

The segment might be defined by the age attribute using the SingleValuedIntegerIsEqualTo function with a corresponding single integer parameter (in this example, assume the integer value 18 is provided as a parameter). The segment would thus include any user who has an age attribute of 18. Thus, the user who has an age attribute of 17 will not be in the segment.

The segment might be defined by the age attribute using the SingleValuedIntegerIsNotEqualTo function with a corresponding single integer parameter (in this example, assume the integer value 18 is provided as a parameter). The segment would thus include any user who has an age attribute of any integer other than 18. Thus, the user who has an age attribute of 17 will be in the segment.

The segment might be defined by the age attribute using the SingleValuedIntegerIsGreaterThan function with a corresponding single integer parameter (in this example, assume the integer value 18 is provided as a parameter). The segment would thus include any user who has an age attribute of any integer greater than 18. Thus, the user who has an age attribute of 17 will not be in the segment.

The segment might be defined by the age attribute using the SingleValuedIntegerIsLessThan function with a corresponding single integer parameter (in this example, assume the integer value 18 is provided as a parameter). The segment would thus include any user who has an age attribute of any integer less than 18. Thus, the user who has an age attribute of 17 will be in the segment.

The segment might be defined by the age attribute using the SingleValuedIntegerIsInRange function with two corresponding two integer parameters (in this example, assume the integer values 18 and 65 are provided as parameters). The segment would thus include any user who has an age attribute of any integer between 18 and 65. Thus, the user who has an age attribute of 17 will not be in the segment.

The segment might be defined by the age attribute using the SingleValuedIntegerIsInList function with multiple corresponding single integer parameters (in this example, assume the integer values 12, 14, 16 and 18 are provided as parameters). The segment would thus include any user who has an age attribute of 12, 14, 16 or 18. Thus, the user who has an age attribute of 17 will not be in the segment.

The segment might be defined by the age attribute using the SingleValuedIntegerIsNotInList function with a list of corresponding single integer parameters (in this example, assume the integer values 12, 14, 16 and 18 are provided as parameters). The segment would thus include any user who has an age attribute other than 12, 14, 16 or 18. Thus, the user who has an age attribute of 17 will be in the segment.

Thus, by correlating specific segment definition functions to particular attribute types, a wide variety of segments may be defined. In one embodiment, each specific segment definition function has a corresponding query that may be applied to populate the segment. For instance, if the tables of FIGS. 3 through 7 were included in a SQL database, there may be a pre-compiled query template for each segment definition function. The parameters provided for the function may then be used to populate the pre-compiled query template to formulate an actionable SQL query that, when submitted to the SQL database, results in the populated segment.

With respect to FIG. 4, this discussion will initially focus on defining the segment only, not on population of a segment with actual user identifiers. A segment is a group that is defined based on one attribute. As described above, a segment definition function is applied on that attribute along with appropriate parameters, if necessary, to define a segment. Once the segment is defined, the segment may be populated by finding users that satisfy the bounds of the segment.

The defining of segments centers around the segment table 401. The tables includes the attribute table 302 previously discussed with respect to FIG. 3. The segment table 401 is also relationally connected to SegmentDefinitionFunction table 402, SegmentDefinitionParameterStringValue table 403, SegmentDefinitionParameterIntegerValue table 404, and SegmentDefinitionParameterDateTimeValue table 405.

The segment table 401 defines all of the segments in the system, and includes one segment per row. Each row contains a SegmentId which is a unique identifier that uniquely identifies the segment corresponding to that row. A ShortId, which is an integer value, may also be used to identify the segment. The segment includes a name and a description, in this example, which are string values.

Each row in the segment table 401 also includes an AttributeId that includes the unique identifier for the attribute that the segment is based on. Each row also includes a SegmentDefinitionFunctionId, which is an integer value that uniquely identifies the segment definition function to be applied to the attribute of the segment in order to populate the segment. For instance, the table above includes 24 unique segment functions that were each explained in detail. All that remains to be able to fully define the segment is the parameter (s) that are provided to the segment definition function.

If the segment definition function calls for one exactly one string (e.g., which includes functions SingleValuedStringIsEqualTo, SingleValuedStringIsNotEqualTo, MultiValuedStringHasAnyValueEqualTo, MultiValuedStringHasAnyValueNotEqualTo), then that string is provided in the StringParameter1 column of the row. If the segment definition function calls for a list of strings (e.g., SingleValuedStringIsInList, SingleValuedStringIsNotInList, MultiValuedStringHasAnyValueInList, MultiValuedStringDoesNotHaveAnyValueInList, or MultiValuedStringHasAnyValueNotInList), then the SegmentDefinitionParameterStringValue table 403 includes a row for each string in the list. Each row in the table 403 includes the SegmentId that the parameter is related to, and the value of the parameter.

If the segment definition function calls for one exactly one integer (e.g., which includes functions SingleValuedIntegerIsEqualTo, SingleValuedIntegerIsNotEqualTo, SingleValuedIntegerIsGreaterThan, SingleValuedIntegerIsLessThan, or SingleValuedDateTimeIsEqualToTodayPlusOrMinus), then that integer is provided in the IntegerParameter1 column of the row in segment table 401. If the segment definition function calls for exactly two integers (e.g., which includes function SingleValuedIntegerIsInRange), then the lower integer is provided in the IntegerParameter1 column of the row in segment table 401, and the higher integer is provided in the IntegerParameter2 column of the row in segment table 401. If the segment definition function calls for a list of integers (e.g., which is the case in functions SingleValuedIntegerIsInList and SingleValuedIntegerIsNotInList), then the SegmentDefinitionParameterIntegerValue table 404 includes a row for each integer in the list. Each row in the table 404 includes the SegmentId that the parameter is related to, and the value of the parameter.

If the segment definition function calls for one exactly one datetime (e.g., which includes functions SingleValuedDateTimeIsEqualTo, SingleValuedDateTimeIsNotEqualTo, SingleValuedDateTimeIsGreaterThan, or SingleValuedDateTimeIsLessThan), then that datetime is provided in the DateTimeParameter1 column of the row in segment table 401. If the segment definition function calls for exactly two datetimes (e.g., which includes function SingleValuedDateTimeIsInRange), then the earlier datetime is provided in the DateTimeParameter1 column of the row in segment table 401, and the later datetime is provided in the DateTimeParameter2 column of the row in segment table 401. If the segment definition function calls for a list of datetimes (e.g., which is the case in functions SingleValuedDateTimeIsInList and SingleValuedDateTimeIsNotInList), then the SegmentDefinitionParameterDateTimeValue table 405 includes a row for each datetime in the list. Each row in the table 405 includes the SegmentId that the parameter is related to, and the value of the parameter.

The SegmentDefinitionFunction table 402 correlates the SegmentDefinitionFunctionId with an actual name for the segment definition function. New segment definition functions may be added by adding entries to the SegmentDefinitionFunctionId table 402.

The segment table 401 also includes columns for LastMembershipCount, which includes a population count of the users in the given segment for the row, and a LastMembershipCalculation, which includes the date and time that the count was last taken.

Accordingly, the segment table 401 defines multiple segments, each by attribute, segment definition function, and potentially parameters. The tables permit for new segment definition functions to be added without changing the schema. The tables of FIGS. 3 and 4 may be navigated in order to populate the various defined segments as will be described further below with respect to FIG. 6.

As previously discussed, segments are defined based on a single attribute. The segments may even be populated based on a single query, as previously described. The segments may be reused, and need not be recalculated in real-time, but may be periodically recalculated.

The principles described herein permit more complex user groups (called herein profile groups) to be defined that are based on most likely multiple attributes. Such a description of profile groups could be very difficult to accomplish using a code-based solution if the number of users were great, the number of user attributes were large, and the conditions for being included in the profile group were complex. However, once the segments are calculated, it may be relatively less processing-intensive to formulate complex profile groups. As an example, profile groups may be defined by specifying which segments are to be included, and which segments are to be excluded in a set function.

As an example, one profile group could include users that live in the United States, who have purchased product A or B, who have logged into the system in the last 30 days, who are between 18 and 25 years old, but have not purchased product C. The formulation of that profile group includes first the determination of five discrete segments as follows:

Segment 1—Those users who live in the United States;
Segment 2—Those users who have purchased product A or B;
Segment 3—Those users who logged into the system in the last 30 days;
Segment 4—Those users who are between 18 and 25 years old; and
Segment 5—Those users who have purchased product C.

Segment 1 may have been defined by using the SingleValuedStringIsEqualTo function with single string parameter "United States" applied to a residence country single-valued string attribute.

Segment 2 may have been defined by using the MultiValuedStringHasAnyValueInList function with the parameters being a list of two strings including "Product A" and "Product B" as applied against the users' list of products purchased multi-valued string attribute.

Segment 3 may have been defined by using the SingleValuedDateTimeIsGreaterThan function with the parameter of a datetime equal to 30 days prior to the current date as applied against the users' last log-in datetime attribute.

Segment 4 may have been defined by using the SingleValuedIntegerIsInRange function with the parameters 18 and 25 as applied against the users' age attribute.

Segment 5 may have been defined by using the MultiValuedStringHasAnyValueEqualTo function with the parameter "Product C" as applied against the users' list of products purchases multi-valued string attribute.

The formulation of the profile group based on these segments may be performed by including some of the segments (i.e., segments 1 through 4) and excluding some of the segments (i.e., segment 5). Since the segments are formulated, the formulation of the profile group may also be formulated using an automated query. For instance, the following SQL query might be formulated:

Included Segment 1(INTERSECT Included Segment 2(INTERSECT Included Segment 3(INTERSECT Include Segment 4))) (MINUS Excluded Segment 5)

In fact, regardless of the segments 1 through X that are to be included, and regardless of the segments I, II, through Y that are to be excluded, the query may take the following automated form:

Included Segment 1(INTERSECT Included Segment 2(INTERSECT Included Segment 3( . . . INTERSECT Include Segment X . . . )))(MINUS Excluded Segment I)(MINUS Excluded Segment II)( . . . )(MINUS Excluded Segment Y)

In this example, set intersection and set exclusion operations are performed. However, set union operations may also be performed. For example, any of the INTERSECT operator in the above example could be INTERSECT operators or UNION operators. In order to determine which segments to include and exclude in order to formulate a profile group, the tables of FIG. 5 may be used in one implementation. FIG. 5 shows the segment table 401 introduced in FIG. 4, and also includes a ProfileGroup table 501 and a ProfileGroupXSegment table 502. The ProfileGroup table 501 defines all of the profile groups, with one profile group per row. The ProfileGroup table 501 has columns for the ProfileGroupId which uniquely identifies the profile group, a ShorId being an integer identifier for each profile group, and a name and description for each profile group. The table 501 also includes a last membership count and last a time and date of the last membership calculation.

The ProfileGroupXSegment table 502 connects each profile group with the corresponding segments which are to make up the segment, and includes a designation on whether each segment is to be included or excluded. For instance, each row in the ProfileGroupXSegment table 502 maps a segment (via the SegmentId field) to a profile group (via the ProfileGroupId field), and indicates via the IsInclusive bit whether or not the segment is to be included or excluded. There may be multiple rows corresponding to a single profile group where multiple segments are used to define a single profile group. In the above case, where there were 5 segments used to define a profile group, there would be five rows in the ProfileGroupXSegment table 500, each pointing to the same ProfileGroupId, but each pointing also to a different segment, with all but one of the rows specifying that the segment is to be included. Segments may be reused from one profile group to another, without requiring recalculation of the segments themselves. When a profile group is to be calculated, the calculation checks to make sure the segments themselves are populated. This can be done by checking the attribute, function, and parameters used to generate a segment, and making sure they are correct, and making sure the segment was recalculated recently enough to be useful.

There may be a user interface that appears to users that allows the user to interface with segment 401 to formulate segments based on user attributes. This is represented abstractly in the form of the segment definition user interface 211 of FIG. 2. There may also be a user interface that allows users to formulate profile groups based on those segments. This is represented abstractly in the form of the profile group definition user interface 221 of FIG. 2.

For the segment definition user interface 211, the user may be presented with attributes upon which a segment may be built, allowing a user to sort through and select the attribute. Then, based on the attribute type, the possible segment definition functions may be presented in intuitive form. Then based on the selected segment definition function, the user interface may provide appropriate parameter fields that the user may enter the appropriate parameter into. There may also be validation checks to make sure the appropriate data type is entered for the parameter. For instance, for a datetime, the system may validate that the user truly entered an acceptable datetime into the corresponding field. From this data, the appropriate queries may be generated to formulate the segments.

For the profile group definition user interface 221, the system may present the user with the group of available segments, and allow the user to combine those segments, and specify which are to be included and excluded. From this data, the appropriate query may be generated to formulate the profile group. The end result is the identification of a group of users that satisfy potentially very complex profiles based on multiple user attributes. Further, the formulation of the segments and profile groups has allowed increased processing efficiency by basing profile group calculations based on segments, and by reusing segments. Thus, the system may be scalable even where there are numerous users, user attributes, complex profile groups, and many profile groups.

FIGS. 3 through 5 permit the defining of segments and profile groups. The segments and profile groups may be populated by formulating queries based on the segment and profile group definitions. FIG. 6 illustrates how the resulting segments and profile groups may be populated in the context of the user table 301 of FIG. 3.

Referring to FIG. 6, the populated segments are represented in the form of a UserXSegment table 601 that relationally is between the user table 301 and the segment table 401.

Each row in the UserXSegment table 601 includes a UserId and a SegmentId which indicates that the identified user belongs to the identified segment. Of course, there will be multiple rows with the same SegmentId when there are multiple users within a segment, and there will be multiple rows with the same UserId if the user is in multiple segments. In one embodiment, there is a user interface through which a user can query which segments a user belongs to, as well as which users belong to a particular segment.

Likewise, the populated profile groups are represented in the form of a UserXProfileGroup table 602 that relationally is between the user table 301 and the ProfileGroup table 501. Each row in the UserXProfileGroup table 602 includes a UserId and a ProfileGroupId which indicates that the identified user belongs to the identified profile group. Of course, once again, there will be multiple rows with the same ProfileGroupId when there are multiple users within a profile group, and there will be multiple rows with the same UserId if the user is in multiple profile groups. In one embodiment, there is a user interface through which a user can query which profile groups a user belongs to, as well as which users belong to a particular profile group.

Once a UserId is associated with one or more segments and one or more profile groups, that SegmentId and ProfileGroupId for those segments and profile groups to which the user belongs may be downloaded to the user, perhaps in the form of a cookie to be stored with the user's browser. The segments and profile group memberships may be recalculated on a period basis, perhaps every 24 hours or so.

When the user logs into an online application, the SegmentIds and ProfileGroupIds of the user may be uploaded with that cookie. If the data is not too stale, some of that information might be used to determine the segments and profile groups to which the user belongs. For instance, the segments and profile group identifiers provided in the cookie might be useful if there has not been a recalculation of segment and profile group memberships in the interim.

FIG. 7 illustrates relational database table structures involved with the defining of whole marketing campaigns based on profile group membership and available content. The ProfileGroup table 501 of FIG. 5 is included in FIG. 7 and as structured as previously described.

A Content table 701 defines available content, and includes a ContentId column that includes a unique identifier for a particular piece of content, a ContentTypeId column for defining the content type associated with the associated content defined by the ContentId. More regarding the ContentTypeId will be described with the discussion of the TacticTypeId below. An ExternalKey column includes a key that may be used to acquire the associated content. The content may be located anywhere, and the key may be used by the system to navigate the appropriate negotiation to acquire the content.

The Tactic table 702 defines the various metadata properties which can be used to deliver content to an audience. Each tactic includes an associated TacticId. The audience may be flexibly defined using the TacticXProfileGroup table 703 using set operations on profile groups.

For instance, suppose there are three profile groups A, B and C. Now suppose that an audience for a particular tactic is to be defined as all users in either profile group A, or profile group B, but excluding any user in profile C regardless of their membership in profile group A or profile group B. In that case, the TacticXProfileGroup table 703 includes a tactic identified in the TacticId column that properly identifies the tactic. There would also be a profile group identifier in an associated ProfileGroupId field that identifies profile group A, with the IsInclusive field being set, thereby including profile group A in the tactic audience. To include profile group B in the audience, there would also be a group identifier in an associated ProfileGroupId field that identifies profile group B, with the IsInclusive field being set, thereby including profile group B in the tactic audience. Finally, to exclude profile group C from the audience, there would also be a group identifier in an associated ProfileGroupId field that identifies profile group C, with the IsInclusive field not being set, thereby excluding profile group C from the tactic audience. Accordingly, the TacticXProfileGroup associates a tactic with a particular audience, the audience being defined by a set operation on one, multiple, or potentially many profile groups.

The TacticXContent table 704 allows for the association of one or more items of content with a given tactic. For instance, suppose that content items 1 and 2 are eligible to be delivered as part of the tactic. There would be a tactic identifier identifying the tactic in the TacticId column of the TacticXContent table 704. There would then be an entry containing a content identifier for the content item 1 in the ContentId field of the table 704. There would likewise be an entry containing a content identifier for content item 2 in the ContentId field of the table 704. Thus, the TacticXContent table 704 provides a many-to-many mapping capability between content and tactics such that multiple items of content may be mapped to particular tactic, and such that multiple tactics may deliver a particular item of content.

Referring to the Tactic table 702, the TacticId column contains a list of tactic identifiers. For each tactic, there may be an ExternalKey which allows the tactic to be associated with an external system. For instance, perhaps a particular tactic involves the sending of an e-mail having particular content to a particular audience. In that case, the ExternalKey may contain information necessary to access or activate the external e-mail system for purposes of implementing the tactic.

The Name and Description columns may contain a human-readable name and description for each tactic.

The TacticTypeId column identifies a type of tactic. For instance, there might be one tactic type identifier associated with tactics that deliver content via web navigation in which a user request a web page, and the tactic is used to customize the web page depending on whether the user is in the audience associated with the tactic. There might be a different tactic type identifier for e-mail delivery of content to a particular audience. Accordingly, the principles described herein allow for the efficient identification of which content is to be delivered to which user, regardless of the delivery mechanism for getting that content to the user. The TacticTypeId of the Tactic table 702 may be related to the ContentTypeId of the Content table 701. For example, email tactics might only be associated with email content, Web site tactics might only be associated with Web site content, and so forth.

Each tactic may also contain a priority value that assists in resolving conflicting tactics in which different content is manifested as to be delivered to the same user. An example is provided below with respect to FIG. 8.

The remaining fields may be related to the delivery process associated with the tactic type. For instance, for e-mail delivery, such fields might define a timing for delivery of an e-mail, a formatting type of the e-mail, a retry policy, and the like.

The Campaign table 705 allows for the defining of comprehensive campaigns that include one or more and potentially many tactics. Each campaign includes a campaign identifier provided in the CampaignId column of the table 705. A CompaignXTactic table 706 provide a many-to-many mapping capability between campaigns and tactics such that a single campaign may contain multiple tactics, and such that a particular tactic may be reused for multiple campaigns.

The Campaign table 705 also includes an ExternalKey field for each campaign for associating the campaign with external systems.

Each campaign may also have a human readable name and description to allow a reader to quickly understand the nature of the campaign.

A campaign state identifier allows for the identification of the state of the campaign, whether the campaign has started, competed, is in process, is in testing, or the like.

The campaign also includes a priority to allow for resolution of conflicting campaigns. Once again, an example of the use of campaign priority will be provided below with respect to FIG. 8.

A start date and an end date allows for the defining of a timeframe in which the campaign is to be in effect.

The table structure of FIG. 7 allows for rapid association of content with a particular user. For example, consider an example in which a user navigates to a web page that is served by the relational table structure of FIGS. 3 through 7. The user's browser might provide a cookie that already identifies the profile groups in which the user belongs. If not, or if the cookie is no longer valid, the profile groups may be quickly obtained from the table structure of FIG. 6 as previously described. Then, a cookie could be provided to the user for future web requests from that user. As an example, the cookie could be calculated and provided to the user at the beginning of a session, and used during the course to the session, such that the profile groups for a user are only retrieved once per session.

In addition to efficient determination of the profile group(s) in which the user belongs, there is also efficient dissemination of the content associated with particular audiences defined by the profile groups. For instance, rather than navigating the table structure of FIG. 7 each time content is to be delivered to a particular user in an audience (requiring an expensive round trip to the database), the table structure may be navigated on a periodic basis appropriate for the objectives of the campaign to generate a content association mapping that may be interpreted without re-navigating the database. The content association mapping may be provided to each front end server and be considered valid for a particular period of time. For instance, in web navigation, perhaps every 30 minutes is appropriate for updating of the content association mapping, with shorter durations being feasible if desired.

FIG. 8 illustrates an example content association mapping 800 for a simplified example. In this example, customized web page content is provided. In addition, in this scenario, there are three tactics (identified as T1, T2 and T3), four profile groups (PG1, PG2, PG3 and PG4), and two campaigns (identified as C1 and C2). In addition, tactics T1 and T3 have been assigned a higher priority (i.e., 1) as compared to the tactic T2 (i.e., 2). The campaign C1 has also been assigned a higher priority (i.e., 1) as compared to the campaign C2 (i.e., 2).

Each row in the content association mapping 800 corresponds to a particular campaign, tactic, profile group, content, and inclusion parity. Thus, the content association mapping 800 may be generated and updated periodically by navigating the database to find all permutations of associations between campaigns, tactics, profile groups and content, and created a row entry for each permutation in the content association mapping. In the content association mapping 800, there are seven rows, each corresponding to one of the associations. To avoid distraction, the associations that are not relevant to the example are omitted. Accordingly, the 7 rows only represent a subset of all of the possible permutations. For instance, the actual content association mapping 800 might also include associations with TacticTypeId's. However, in this example, customization of a web page is described, and that is the only TacticTypeId. Accordingly, the further permutations associated with having multiple TacticTypeId's are not shown in FIG. 8. More complex campaign systems may contain many more associations, each downloaded to the front end servers as the mappings are updated on a periodic basis.

In this example, row 1 indicates that as part of campaign C1 (having a priority 1), according to tactic T1 (having priority 1), the content identified by the external key Home\Engagement\StoreManager is to be provided to members of profile group PG1.

Row 2 indicates that as part of campaign C1 (having a priority 1), according to tactic T1 (having priority 1), the content identified by the external key Home\Engagement\WebSeminar is to be provided to members of profile group PG2.

Row 3 indicates that as part of campaign C1 (having a priority 1), according to tactic T2 (having priority 2), the content identified by the external key Home\Engagement\WebSite is to be provided to members of profile group PG1.

Row 4 indicates that as part of campaign C2 (having a priority 2), according to tactic T3 (having priority 1), the content identified by the external key Home\E-mail\WebSite2 is to be provided to members of profile group PG2.

Row 5 indicates that as part of campaign C2 (having a priority 2), according to tactic T3 (having priority 1), the content identified by the external key Home\Engagement\WebSite3 is to be provided to members of profile group PG2.

Row 6 indicates that as part of campaign C2 (having a priority 2), according to tactic T3 (having priority 1), the content identified by the external key Home\Engagement\WebSite4 is to be provided to members of profile group PG3.

Row 7 indicates that as part of campaign C2 (having priority 2), according to tactic T3 (having priority 1), the content identified by the external key Home\Engagement\WebSite5 is NOT to be provided to members of profile group PG4.

The content association table may be quickly navigated using a navigation algorithm to find the content that is to be downloaded to a particular user, once the profile group(s) that the user belongs to have been identified. An example algorithm is now described.

First, all items in the content association table are matched against the desired content location. For instance, suppose a web page has two portions that are to be customized. One way to organize that would be to have all possible customized content for one location have one particular root path in the external key (e.g., Home\E-mail) while another location has a different distinct root path in the external key (e.g., Home\Engagement). In this example, suppose that the request is for content to populate the location associated with the Home\Engagement root path. In that case, rows 1, 2, 3, 5, 6 and 7 could potentially qualify. Row 4 does not qualify since the external key begins with Home\E-mail, and not Home\Engagement. A separate request may later be submitted to acquire the content for the different location associated with the Home\E-mail root path, but this scenario is focused on the request to populate a location associated with the Home\Engagement root path.

Thus far, rows 1, 2, 3, 5, 6 and 7 continue to be candidates for selecting the content for delivery heading into the next step of the selection process. The next step is to factor in the profile group membership of the user. In this case, suppose that the user is a member of profile groups PG1, PG2 and PG4, but is not a member of profile group PG3. Row 6 is eliminated from contention as the user is not a member of profile group PG3. Row 7 is also eliminated because the user is a member of profile group PG4, and thus content Home\Engagement\WebSite5 is not to be provided. Thus, rows 1, 2, 3 and 5 continue to the next step of the selection process.

Next, the process filters on the highest priority of the campaign. Here, rows 1, 2, and 3 are selected as they correspond to a campaign C1 having a higher priority (i.e., 1) than the row 5, which corresponds to a campaign C2 having a lower priority (i.e., 2). Thus, rows 1, 2, and 3 continue to the next stage of the selection process.

Next, the process filters on the highest priority of the tactic. Here, rows 1 and 2 are selected as they corresponding to a tactic T1 having a higher priority (i.e., 1) than the row 3, which corresponds to a tactic T2 having a lower priority (i.e., 2). Thus, rows 1 and 2 continue to the next stage of the selection process.

Assuming that only one piece of content should be provided, the final stage is to then select from the remaining rows at random. Suppose that the result of a random selection between rows 1 and 2 is that row 1 is selected. In that case, the external key Home\Engagement\StoreManager is used to acquire the content, and download that content to the client to populate the corresponding portion of the web page with content.

A user interface may also be provided that allows a user (such as a marketing manager) to directly input complex campaigns into the system by defining tactics to include a coupling of content with particular audiences, and defining campaigns to include one or more tactics. The system is flexible as the manager can make changes to these associations in real-time, and such changes will propagate to actual implementation within a short period of time. For instance, if the manager makes a change to the tactics or campaign, such changes will be propagated into the content association mappings on the front end servers within a short period of time (e.g., 30 minutes in the example provided above). Furthermore, if there are changes to profile group membership, the profile group memberships are periodically updated to account for changes in the profile group definitions and/or changes in user attributes. In addition, in one embodiment described below with respect to FIGS. 9 through 13, for some events, the profile groups may be updated in real-time in response to the events. FIGS. 9 through 13 will be described in further detail below.

In one embodiment, there is a profile group that is called a "Default Profile Group." The front end web servers might always assume that everyone is a member of the default profile group, even if the membership in the default profile group is not mentioned in the cookie provided by the client. A default content campaign could then be created with this default campaign being the lowest priority campaign. Thus, the default campaign would only come into play when no other personalized content was applicable. This ensures that the user does not end up seeing a blank screen.

In one embodiment, a single item of content is not selected for distribution to the audience, but rather all of the content is selected for distribution to the audience. For example, while a webpage may only render one piece of content in a given location at any time. On the other hand, for e-mail, a user can always receive all the emails intended to be delivered across campaigns and tactics. In that implementation of e-mail, the process associated with selection of a single piece of content may be avoided. However, even in e-mail, the single best e-mail might also be selected, requiring navigation through the selection process.

The system may also be quite fast. As previously mentioned, the determination of the profile group may be made quickly by accessing the database when needed to calculate the profile group membership, but by otherwise storing the profile group membership for any given user in a cookie that may survive the duration of the session, or even longer perhaps. Likewise, the content association may be made for any given request using the content association table, and a fast selection process, rather than having to query the database for each request.

The system may also be scalable. As additional users are added, the process for recalculation of the profile groups is still performed generally on a periodic basis, albeit with some additional calculation for the additional users. Furthermore, the process of updating content association tables remains the same. If the addition of new users eventually leads to the augmentation of the possible profile groups, then some additional calculation may be needed to populate the additional profile group, and there may be some additional tactics and/or campaigns that apply to the new profile group. However, the processing cost for adding new users and profile groups is fairly low.

As previously mentioned, the profile group memberships may be updated periodically. In one embodiment, it may be that information is learned regarding a user only when the user logs into an online application, or perhaps as the user interacts with the online application. For instance, perhaps a preferred language, a user's computing environment, an online status, or other attributes are only determined when the user is actively communicating with the online application. Also, perhaps the user interacts with the online application, such interaction causing changes to user attributes. For instance, if a user were to purchase a product, that user should no longer be included in segments of users who have not purchased the product and should be removed from segments of users who have purchased the product. FIGS. 9 through 13 illustrate how the segments (and profile groups) may be updated in response to dynamic changes performed at run-time by a particular user. Note that a real-time change in attribute for the user may eventually result in a recalculation of the segment at the service, and a recalculation of profile groups at the service. However, rather than wait for such a recalculation, the event modifies the segment membership directly at the user's local computer as illustrated and described further below with respect to FIGS. 12 and 13. In some cases, the event may not cause a change in any user attribute at all.

Figure 10:
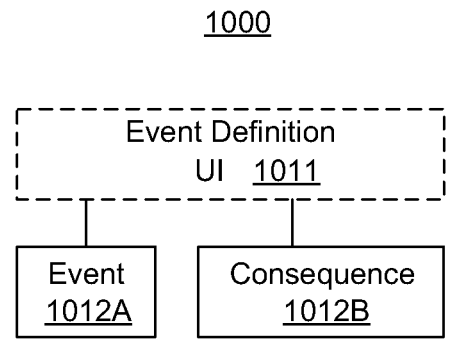
FIG. 10 illustrates an environment that includes an event definition user interface.

FIG. 10 illustrates an environment 1000 that includes an event definition user interface 1011. Through the user interface 1011, the user may provide a designation of an event 1012A, and a designation of a consequence 1012B of the event in terms of membership in one or more user segments. For example, such segments may be the populated segments 215 of FIG. 2, which may be updated in response to real-time events or newly learned user attributes.

Examples of real-time events might be, for example, that the user has purchased a particular product (which might be done while the user is logged into the on-line application) or that the user has uploaded a document (which might have been at the prompting of the on-line application). Another example of newly learned information might include the type of computing system that the user has logged in using (e.g., in terms of display capabilities, processing capability, and the like).

Examples of the consequences of the event in terms of segment membership might include, for example, the addition of a user identifier that is the subject of the event to one or more segments. Alternatively or in addition, as another example, the consequence of the event might include the removal of a user identifier that is the subject of the event from one or more segments. For instance, if a user purchases product A (an example of a real-time event), the consequence might be to remove in real-time the corresponding user from the segment that includes users that have not purchased product A (if that segment existed), and add the user to the segment that includes users who have purchased product A (if that segment existed). Thus, the system maintains a record of a number of events, and a consequence of each event in terms of altering membership in the segments.

Figure 11:
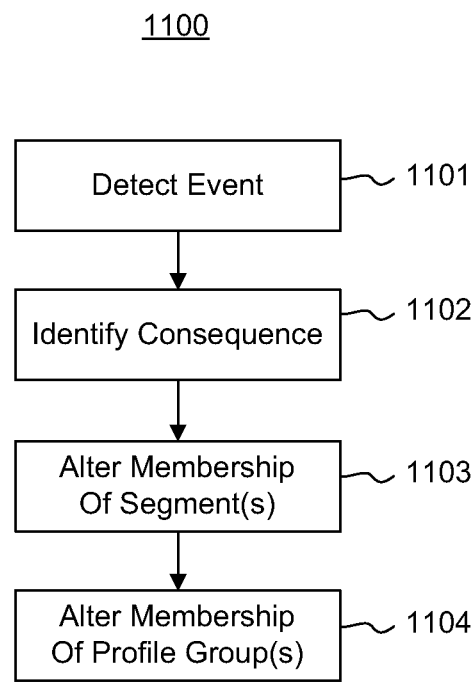
FIG. 11 illustrates a flowchart of a method for responding to an event.
Figure 12:
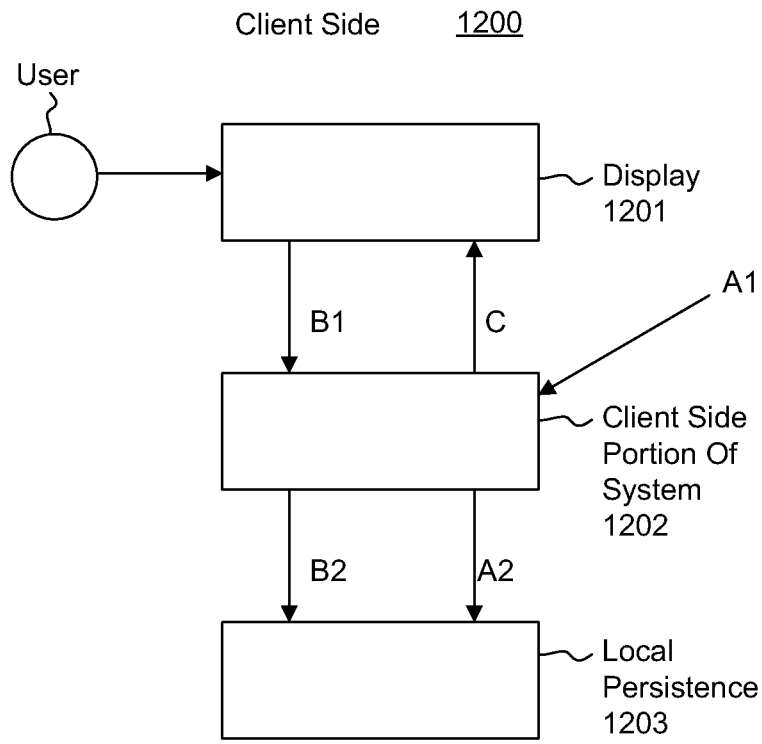
FIG. 12 illustrates a client-side diagram showing processing flows associated with the client's user's locally cached version of the data being updated in response to an event.

FIG. 11 illustrates a flowchart of a method 1100 for responding to an event. The method 1100 may be performed in the client-side environment 1200 of FIG. 12. Accordingly, FIG. 11 will now be described in detail with frequent reference to FIG. 12. The formulations of segments and profile group operations that have been described with respect to FIGS. 2 through 6 may be performed at the service. In addition, the mapping of real-time events to consequences (described in FIG. 11) may also be represented at the service. Referring to FIG. 12 (as represented by arrow A1), the pre-calculated information regarding segment and profile groups and regarding real-time events and their consequences may be downloaded to the client side for at least those portions relevant to the user. As represented by arrow A2, this information is persisted locally at the client-side.

The method 1100 is initiated upon detecting an event (act 1101) that is one of the events that is being monitored according to FIG. 10. For example referring to FIG. 12, the user is interacting with a display 1201, which may be, for example, the display 112 of FIG. 1. As the user interacts with the display, the event may be triggered. The triggering of such events is represented by the arrow B1 in FIG. 12.

The method identifies (act 1102) the corresponding consequence of the detected event, and alters membership (act 1103) on one or more corresponding segments accordingly. Referring to arrow B2 of FIG. 12, the altered membership information is then persisted locally. Optionally, if the altering of the segment membership is an event that causes recalculation of profile group membership, the profile group memberships that rely on the segment(s) whose membership is changed may themselves be recalculated (act 1104). This updating of profile group records may also be persisted locally as represented by arrow B2 in FIG. 12.

Figure 13:
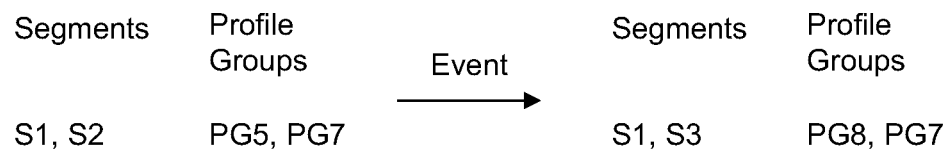
FIG. 13 illustrates changes in segment and program group membership for a user changing as a result of an event.

FIG. 13 illustrates information 1300 regarding a user and which segments and profiles the user belongs to before an event and after an event. Before the event, the user belongs to segments S1 and S2, and belongs to profile groups PG5 and PG7. However, an event that occurred resulted in the user being removed from segment S2 and added to segment S3 locally. This change is represented by the arrow B2 in FIG. 12. The result is that after the event, the user belongs to segments S1 and S3. Also, assume that profile group PG5 required membership in segment S2. Thus, the user no longer is included in profile group PG5. On the other hand, perhaps all users who belong to segment S3 are also included in profile group PG8. Accordingly, the user is added to profile group PG8. Arrow C represents that the user experience may be altered as a result of the change in segment and profile group membership. Thus, the user may trigger an event, and quickly see change in the user experiences as a result, without the service itself needing to perform a recalculation at the server.

Accordingly, the principles described herein allow for active real-time updating of segment memberships (and hence profile group memberships) in response to real-time runtime discoveries or changes regarding user attributes. FIG. 9 illustrates collection of tables that illustrate a mechanism for event driven updating of segment membership.

Event table 901 includes a row for each event that could cause a change in segment membership. Each row includes an EventId that represents a unique identifier for the event, as well as a name for the event. An event manager may track the listed events, and when an event occurs, the EventXSegment table 903 is consulted to determine what updates should be made to which segments.

The EventXSegment table 903 includes entries that each define an update that is to be made to an identified segment (identified by SegmentId in each row) based on a particular event (identified by EventId in each row). The particular update is either to add the user to the segment or drop the user from the segment depending on the value of the TriggerInclusion field of the row. There may be multiple entries in the EventXSegment table 903 for a single EventId, indicating that multiple segments are to be updated in response to the particular event. The event manager may detect events by their EventId, and use the EventXSegment table 903 to detect which segments are to be updated and how.

In one embodiment, the events may be triggered based on the Url triggers. Specifically, an event might be triggered based on the user's browsing activity. For instance, one user attribute may concern whether the user has navigated to a particular web site or not. In that case, if the user browses to that web site, navigation to the URL specified in the UrlTrigger is detected, resulting in the corresponding EventId to be raised. This allows for there to be less, if any, coding performed at the service to be able to detect an event.

Alternatively or in addition, perhaps not only a URL may be relevant, but perhaps parameters associated with the URL as well. Accordingly, the EventTriggeringParameter table 902 provides those additional parameters that should be detected corresponding to particular EventId's which will cause, along with the URL detection, the raising of the corresponding event. Such additional parameters might be detected in the query string or in post data associated with the web page. Thus, for example, the purchase of a book may be detected automatically by detecting that the user has navigated to a particular URL, and that particular items of data are present in the query string and/or in the post data. Likewise, automated uploading of documents may be detected, and most other browser activity may be detected as well, at least to the extent that such activity is identifiable based on parameters specified in the query string or post data.

When the event is triggered, the segment(s) are updated as specified in the EventXSegment table 903. When the segment is updated, the profile group(s) may be updated accordingly as previously described. In addition, online application behaviors that rely on updated segment and profile group membership may be updated based on actual behavior. For instance, if the user has uploaded a document, reminders to upload the document may disappear. If the user has purchased a product, advertisements for that product disappear in real-time, and perhaps advertisements for a new product related to the product just purchased may appear.

In one embodiment, it is the user's local copy of the segment membership and profile group membership that is altered, rather than altering the segment membership and the profile group membership at the server. Specifically, the segment membership may be updated locally, and then the profile group membership may be recalculated only at the local level. This provides more rapid updating of the membership, and avoids large amounts of calculations at the server to continuously recalculate segments and profile groups. This also prevents a need to communicate with the server to request the server make such calculations. Thus, the user's experience is customized in real-time without having to recalculate all segment memberships and all profile group memberships at the service as a number of users interact with the service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable media having thereon computer-executable instructions that, when executed by one or more processors of the computing system, cause the computing system to perform a method comprising:
    an act of defining a plurality of tactics by mapping associated content with an audience in a relational database, wherein, within the relational database, each of the plurality of tactics comprises a TacticId and the audience is defined by one or more TacticXProfileGroups which comprise the TacticId, a ProfileGroupID identifying a profile group, and an indication as to whether the profile group is included or excluded from the audience;
    an act of periodically updating a content association mapping by periodically navigating the relational database to find associations between tactics, content and audiences, wherein the content association mapping may be read without accessing the relational database; and
    for each at least some of the plurality of tactics,
        an act of identifying that a user is a member of an audience of the corresponding tactic, and
        an act of using the content association mapping to identify the content of the corresponding tactic, and
        as a result, an act of causing the identified content to be delivered to the identified user.

2. The computer program product in accordance with claim 1, wherein the audience is defined as a set operation on a plurality of user groups.

3. The computer program product in accordance with claim 1, wherein the act of identifying that a user is a member of an audience of the corresponding tactic comprises:
    an act of navigating the relational database to determine that the user is a member of the audience.

4. The computer program product in accordance with claim 1, wherein the act of identifying that a user is a member of an audience of the corresponding tactic comprises:
    an act of reading a cookie provided by a browser of the user, the cookie identifying information from which the computing system can determine that the user is a member of the audience.

5. The computer program product in accordance with claim 1, wherein the user is using a web browser to navigate to a web page, wherein the content is provided to be populated into the web page.

6. The computer program product in accordance with claim 1, wherein the act of causing the identified content to be delivered to the identified user comprises an act of e-mailing the content to the identified user.

7. The computer program product in accordance with claim 6, wherein the content is also attempted to be delivered to all of the audience by e-mail as a result of the act of using the content association mapping to identify the content of the corresponding tactic.

8. The computer program product in accordance with claim 1, wherein the computer-executable instructions are further structured so that when they are executed by a computing system, the computing system further performs the following:
an act of providing a user interface that may be used to allow a human to set a definition for at least one of the plurality of tactics.

9. The computer program product in accordance with claim 1, wherein the computer-executable instructions are further structured so that when they are executed by a computing system, the computing system further performs the following:
an act of defining at least one campaign as including multiple identified tactics of the plurality of tactics.

10. The computer program product in accordance with claim 9, wherein the computer-executable instructions are further structured so that when they are executed by a computing system, the computing system further performs the following:
an act of providing a user interface that may be used to allow a human to set a definition for the campaign.

11. A method for customizing content rendered on a web page, the method comprising:
an act of receiving a client request for a web page from a client operated by a user, the web page including a portion to be populated with customized content;
an act of comparing a plurality of tactics that each associate content with an audience to determine that there is at least one tactic for which the user is a member of the associated audience, and for which the associated content may be used to populate the portion of the web page, wherein, each of the plurality of tactics comprises a TacticId and the audience is defined by one or more TacticXProfileGroups which comprise the TacticId, a ProfileGroupID identifying a profile group, and an indication as to whether the profile group is included or excluded from the audience; and
an act of using the tactic definition for the at least one tactic to acquire and deliver the associated content to the client.

12. The method in accordance with claim 11, wherein the audience is defined as being a set operation on a plurality of user groups.

13. The method in accordance with claim 12, wherein the set operation includes at least one include operation with respect to one user group, and at least one exclude operation with respect to another user group.

14. The method in accordance with claim 12, wherein at least one of the plurality of user groups is a profile group defined as a set operation on a plurality of user segments that are each defined by applying a function to a user attribute.

15. The method in accordance with claim 11, wherein the plurality of tactics are defined in a relational database.

16. The method in accordance with claim 15, wherein the plurality of tactics are cached in at least one front-end server associated with the web page.

17. The method in accordance with claim 11, wherein the act of determining that there is at least one tactic for which the user is a member of the associated audience, and for which the associated content may be used to populate the portion of the web page further comprises:
an act of selecting exactly one of the at least one tactic when there are multiple tactics for which the user is a member of the associated audience, and for which the associated content may be used to populate the portion of the web page.

18. The method in accordance with claim 17, wherein a priority of the tactic is used to select example one tactic.

19. The method in accordance with claim 17, wherein randomization is used to select example one tactic.

20. A computer program product comprising one or more physical computer-readable media having thereon computer-executable instructions that, when executed by one or more processors of the computing system, cause the computing system to perform a method comprising:
an act of defining a plurality of tactics by mapping associated content with an audience in a relational database, wherein, within the relational database, each of the plurality of tactics comprises a TacticId and the audience is defined by one or more TacticXProfileGroups which comprise the TacticId, a ProfileGroupID identifying a profile group, and an indication as to whether the profile group is included or excluded from the audience;
an act of providing a user interface that may be used to allow a human to set a definition for at least one of the plurality of tactics;
an act of defining at least one campaign as including multiple identified tactics of the plurality of tactics;
an act of providing a user interface that may be used to allow a human to set a definition for the campaign;
an act of periodically updating a content association mapping by periodically navigating the relational database to find associations between campaigns, tactics, content and audiences, wherein the content association mapping may be read without accessing the relational database; and
for each at least some of the plurality of tactics, an act of identifying that a user is a member of an audience of the corresponding tactic, and an act of using the content association mapping to identify the content of the corresponding tactic, and as a result, an act of causing the identified content to be delivered to the identified user.

* * * * *